United States Patent [19]
Liu et al.

[11] Patent Number: 6,000,767
[45] Date of Patent: Dec. 14, 1999

[54] COMPUTER HOUSING

[75] Inventors: Alvin Liu, Taipei Hsien; I-Fee Chen, Chung-Li, both of Taiwan

[73] Assignee: Hon Hai Precision Ind. Co., Ltd., Taipei Hsien, Taiwan

[21] Appl. No.: 09/015,668

[22] Filed: Jan. 29, 1998

[30] Foreign Application Priority Data

Jan. 29, 1997 [TW] Taiwan ................................. 86201691

[51] Int. Cl.⁶ .............................. A47B 81/00; G06F 1/16
[52] U.S. Cl. ........................................ 312/223.2; 361/725
[58] Field of Search ............................. 312/223.2, 223.1, 312/321.5, 326, 329; 361/724, 725, 726, 727, 683, 684, 686; 16/229

[56] References Cited

U.S. PATENT DOCUMENTS

| | | | |
|---|---|---|---|
| 2,895,087 | 7/1959 | Lieb et al. ............................... | 361/724 |
| 2,922,081 | 1/1960 | Dubin ................................... | 361/724 X |
| 4,909,579 | 3/1990 | Liu ....................................... | 312/290 X |
| 5,097,386 | 3/1992 | Byell et al. ........................... | 361/725 X |
| 5,197,789 | 3/1993 | Lin ........................................ | 312/223.2 |
| 5,214,621 | 5/1993 | Maggelet et al. .................... | 312/326 X |
| 5,438,476 | 8/1995 | Steffer ................................. | 312/223.2 X |
| 5,701,231 | 12/1997 | Do et al. ........................... | 312/223.2 X |
| 5,713,647 | 2/1998 | Kim ................................... | 312/223.2 |
| 5,774,330 | 6/1998 | Melton et al. ..................... | 312/223.2 X |
| 5,781,410 | 7/1998 | Keown et al. ...................... | 361/727 X |
| 5,784,251 | 7/1998 | Miller et al. ........................ | 361/725 X |

FOREIGN PATENT DOCUMENTS

WO 96/35160  11/1996  WIPO .

*Primary Examiner*—Peter M. Cuomo
*Assistant Examiner*—James O. Hansen

[57] ABSTRACT

A computer housing comprises a base frame, a mounting bracket, and a top cover. The base frame has a base panel for mounting to a mother board, a front panel, a rear panel for mounting connectors and a power supply thereto, and a locating plate for fixing a riser card thereto. The mounting bracket is supported on the front and rear panels, defines a plurality of screw holes therein for fastening a hard disk and the power supply thereto, and forms a plurality of spring fingers contacting the top cover for providing electrostatic discharge and grounding capabilities. The top cover is U-shaped and forms a plurality of hooks on an inner side thereof for engagement with the base frame.

3 Claims, 6 Drawing Sheets

COMPUTER HOUSING

BACKGROUND OF THE INVENTION

1. Field of The Invention

The present invention relates to a computer housing, and particularly to a computer housing for providing EMI or RFI shielding capabilities and having a suspended bracket for mounting a switching power supply and a hard disk, thereby facilitating the assembly and inspection of the components within the computer housing.

2. The Related Art

A computer housing receives many different components such as a mother board, a hard disk, a floppy disk drive, a switching power supply, etc. During assembly of a computer, most of components have been mounted in predetermined positions before the mounting of mother board. The conventional computer housings disclosed in U.S. Pat. Nos. 5,124,885, 5,164,886, and 5,175,670 require the use of many screws to assemble the switching power supply, hard disk, and other parts or subsystems which become laborious and increases manufacturing costs. During the assembly of conventional housings, all of the components and subsystems are mounted sequentially and inspections of the subsystems cannot be performed until the assembly is completed. For example, the inspection of the connectivity between the power supply and the other subsystems cannot be processed until the power supply and the other subsystems are mounted within the housing and linked together by cables and wires. Computers assembled in this way are difficult to repair since access to the malfunction area is limited due to the structure of the housing and the arrangement of the components therein.

Furthermore, Problems arising from EMI and RFI have yet to be adequately solved by the computer industry. The provision of improved EMI shielding and grounding solutions is required to further advance the design of computer housings. Therefore, a solution must be provided for facilitating the inspection, assembly and repair of a computer which can also provide improved EMI shielding and grounding capabilities thereof.

SUMMARY OF THE INVENTION

In view of the foregoing, an object of the present invention is to provide an improved computer housing which can allow for the easy and convenient inspection of connectivity between a power supply and other subsystems of the computer.

Another object of the present invention is to provide an improved computer housing which has good EMI or RFI shielding and grounding capabilities.

A further object of the present invention is to provide an improved computer housing requiring limited effort to access the components of the computer system mounted therein and which can facilitate the assembly and disassembly of the power supply or other subsystems thereof.

To achieve the objects stated above, an improved computer housing in accordance with the present invention comprises a base frame, a mounting bracket, and a top cover. The base frame has a base panel for mounting to a mother board, a front panel, a rear panel for mounting connectors and a power supply thereto, and a locating plate for fixing a riser card thereto. The mounting backet is supported on the front and rear panels, defines a plurality of screw holes therein for fastening a hard disk and the power supply thereto, and forms a plurality of spring fingers contacting the top cover for providing electrostatic discharge and grounding capabilities. The top cover is U-shaped and forms a plurality of hooks on an inner side thereof for engagement with the base frame.

DETAILED DESCRIPTION OF THE PREFERRED EMBODIMENTS

Figure 1:
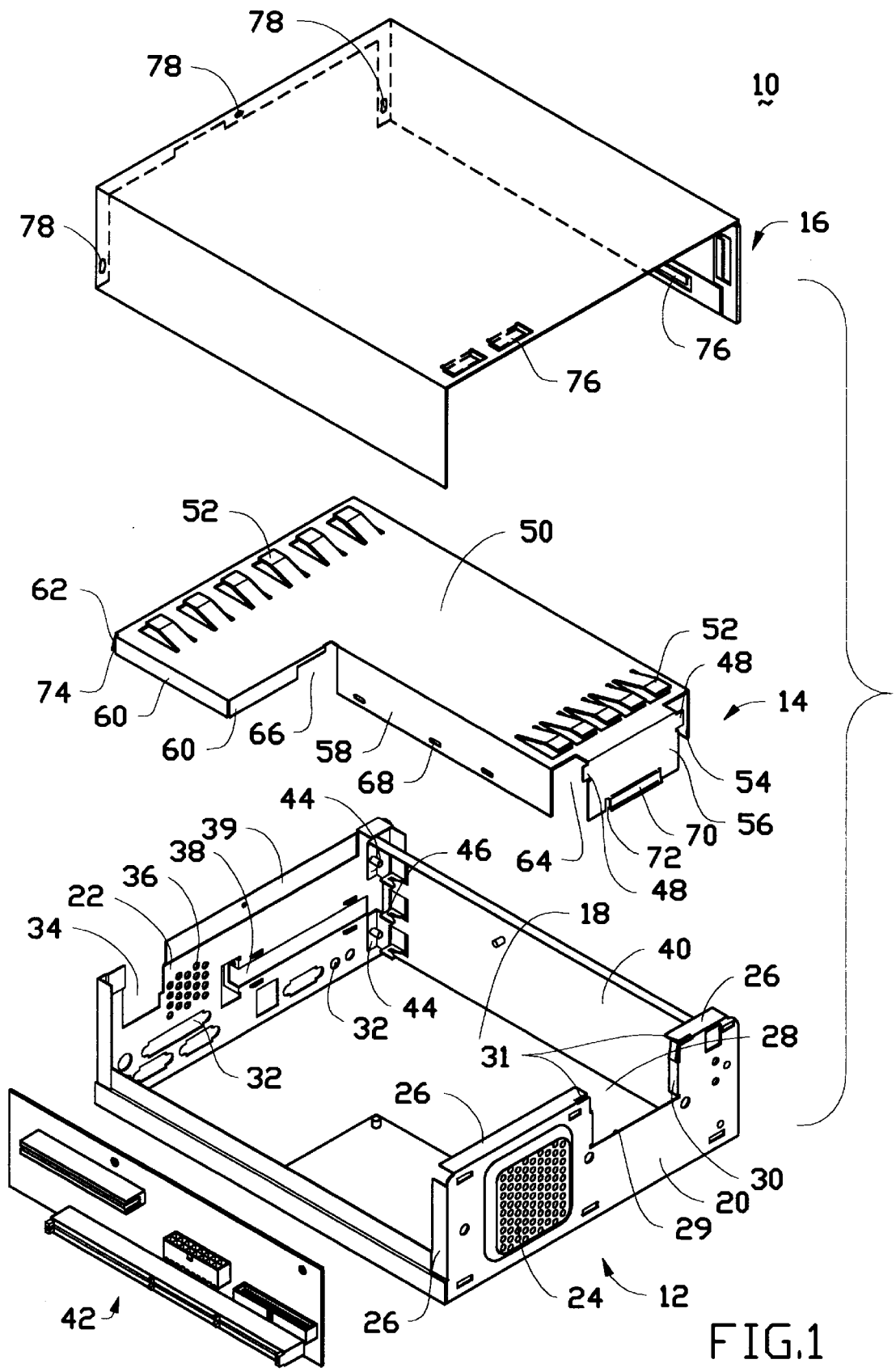
FIG. 1 is an exploded perspective view of a preferred embodiment of a computer housing in accordance with the present invention.

References will now be made in detail to the preferred embodiment of the present invention. For a better understanding, most of like components are designated by like reference numerals throughout the various figures in the embodiments.

Referring to FIG. 1 a computer housing 10 includes a base frame 12, a mounting bracket 14, and a top cover 16. The U-shaped base frame 12 comprises a base panel 18 for mounting to a mother board (not shown), a front panel 20, and a rear panel 22 for mounting connectors and fixing an expansion card (not shown) thereto. The front panel 20 is perpendicular to the base panel 18 and includes a plurality of vent holes 24 for dissipating the heat generated by a CPU, bends 26 for reinforcing the structure of the front panel 20, and a cutout 28 which has an edge 29 on a lower side and two bends 30 on opposing sides thereof. The bends 30, 26 and the front panel 20 define notches 31 for receiving a respective tab 48 of the mounting bracket 14. The rear panel 22 and the front panel 20 are respectively and perpendicularly joined to the base panel 18 at opposite ends thereof. The rear panel 22 defines a plurality of connector holes 32 for receiving connectors (not shown), a cutout 34 on the upper portion for receiving a switch button and an electrical socket (not shown), vent holes 36 for ventilation, and a slot 38 for receiving an expansion card (not shown). A locating plate 40 for fixing a riser card 42 thereto is positioned between the front panel 20 and the rear panel 22. The two lateral sides of the locating plate 40 are folded inwardly to form bends 44 which are riveted to the panels 20, 22. Three notches 46 for receiving the riser card 42 are formed on an inner side of the mounting panel 40.

The mounting bracket 14 supported between the panels 20, 22 has a L-shaped mounting panel 50, a plurality of grounding spring fingers 52 projecting outwardly from the front and rear portions of the mounting panel 50, and arches 54, 56, 58, 60, and 62, inwardly bent and along the edges of the mounting panel 50. The arches 54, 56, 58 and the mounting panel 50 define a first space 64 for receiving a hard disk (not shown). The arches 54, 60, 62 and the mounting panel 50 define a second space 66 for receiving a switching power supply (not shown). The arches 54, 58 define a plurality of screw holes 68 (only shown in the arch 58) for fastening the hard disk and the power supply to the mounting bracket 14 by means of screws (not shown).

Figure 2:
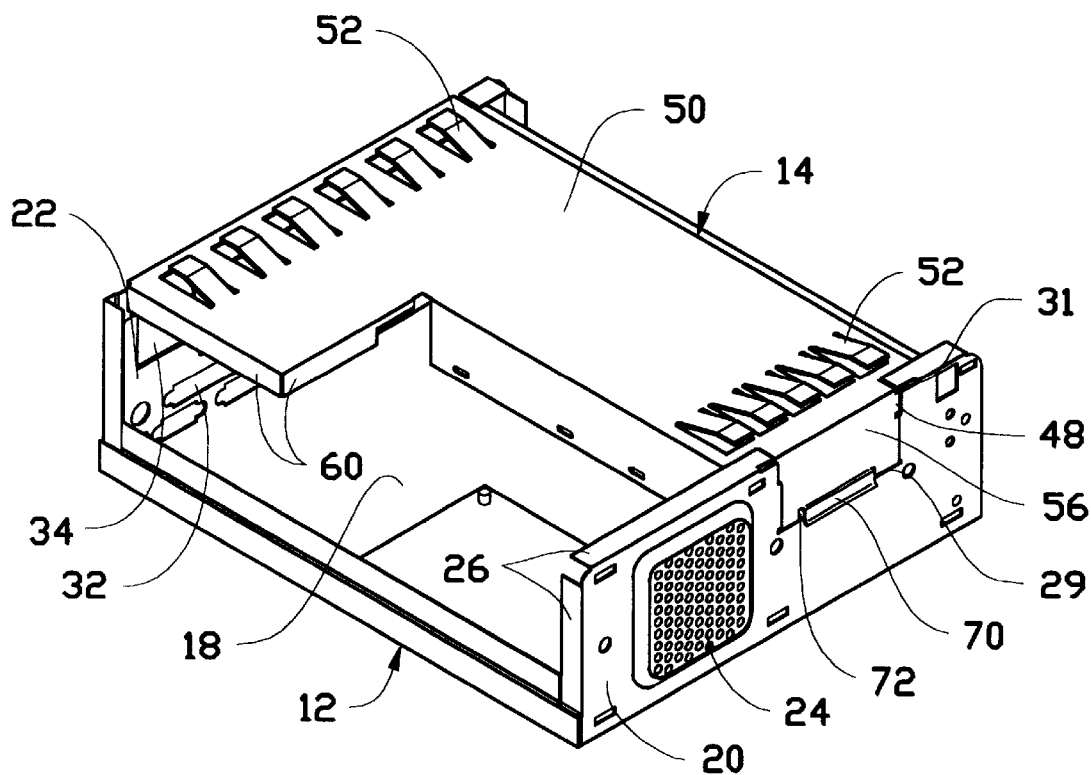
FIG. 2 is a perspective view of the preferred embodiment of the computer housing in accordance with the present invention showing a bracket mounted on a base frame.

The arch 56 forms two tabs 48 on the left and right sides thereof respectively for engagement with the notches 31, and a projection edge 70 on a lower portion thereof defines a gap 72 for engagement with the edge 29 on the front panel 20. The arches 60, 62 define a gap 74 therebetween for engagement with an edge 39 of the rear panel 22. As seen in FIG. 2, the mounting panel 50 can, therefore, be supported on and between the front and rear panels 20, 22.

Figure 3:
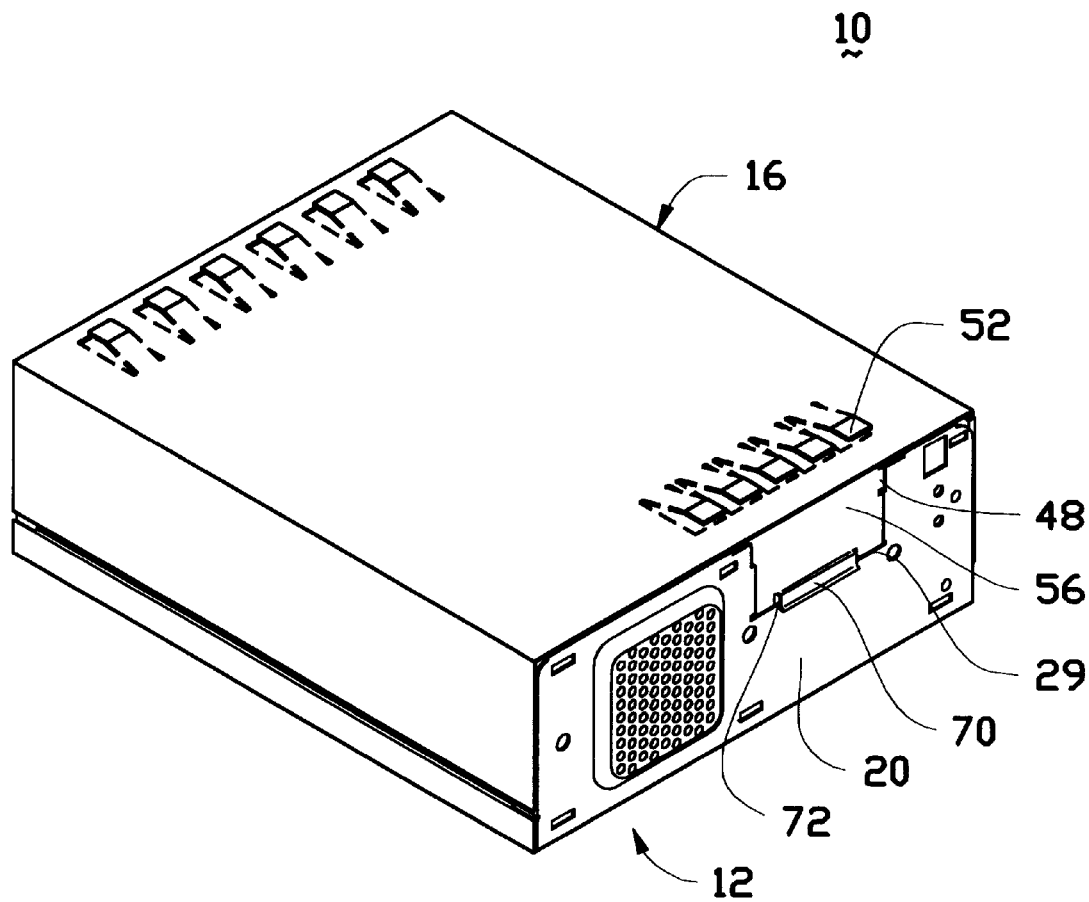
FIG. 3 is a perspective view of the preferred embodiment of the computer housing in accordance with the present invention showing a top cover mounted on the base frame.

The U-shaped top cover 16 has hooks 76 formed on an inner portion thereof which engage with the respective bends 26 of the base frame 12. Screw holes 78 are defined in a rear portion of the top cover 16, the base frame 12 and the mounting bracket 14 to fasten the three parts together by screws (not shown). The top cover 16, the mounting bracket 14, and the base frame 12 are assembled together as shown in FIG. 3. The grounding spring fingers 52 abut against the top cover 16, and the hooks 76 and the gaps 72, 74 (only gap 72 is shown) are respectively engaged with the bend 26 the edges 29, 39. Therefore, the computer housing 10 is provided with EMI shielding and grounding capabilities.

As shown in FIGS. 2 and 3, the hard disk and switching power supply can be respectively received in the spaces 64, 66 of the mounting bracket 14 as a subassembly and then mounted to the base frame 12. In addition, the electrical connectivity between the hard disk and the power supply can be inspected before the other components are assembled in the housing 10 thereby simplifying and modularizing the assembly process of the computer system and providing easier access to components to reduce complications arising during repair thereof.

Figure 4:
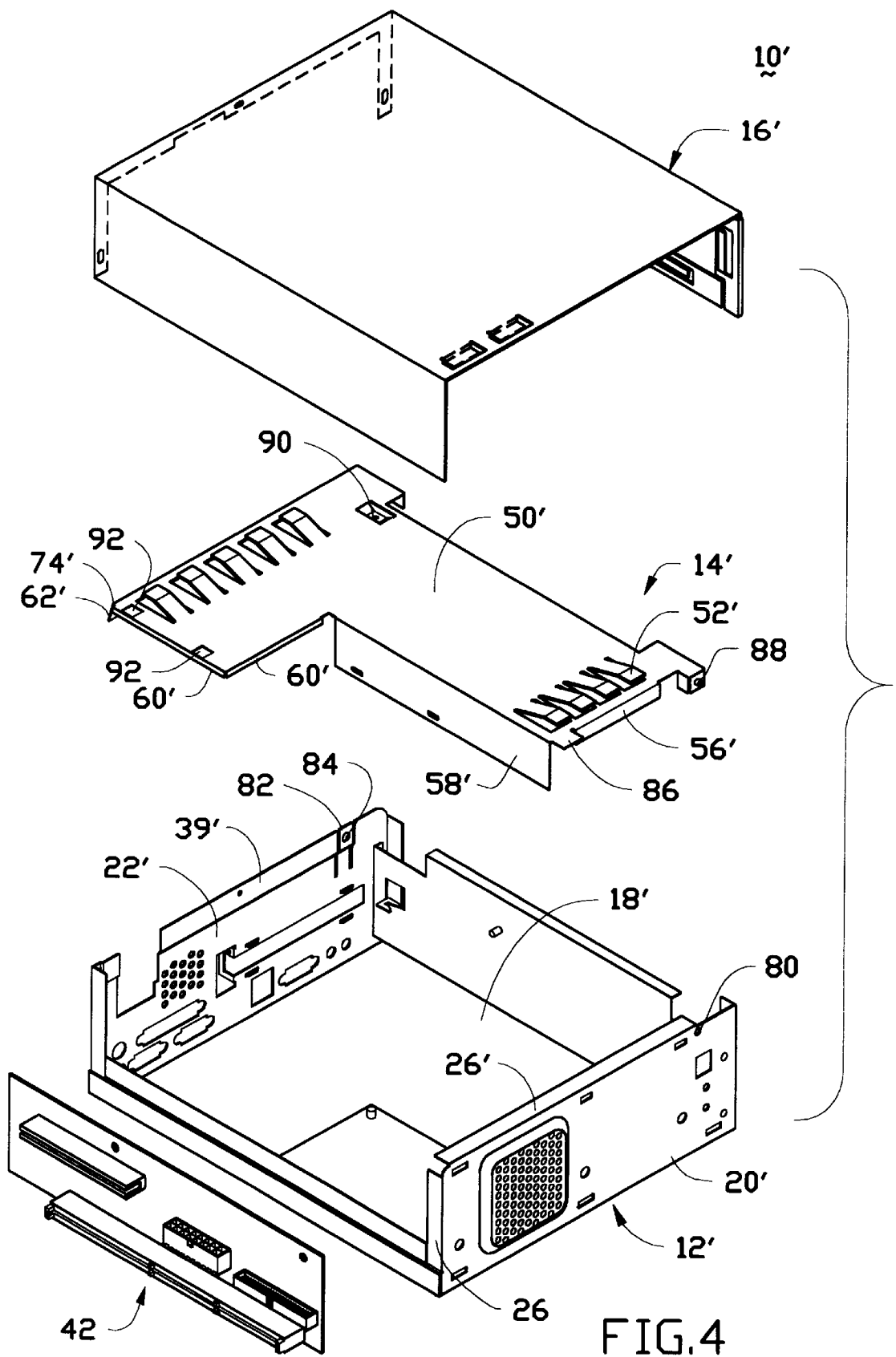
FIG. 4 is an exploded perspective view of a second embodiment of a computer housing in accordance with the present invention
Figure 5:
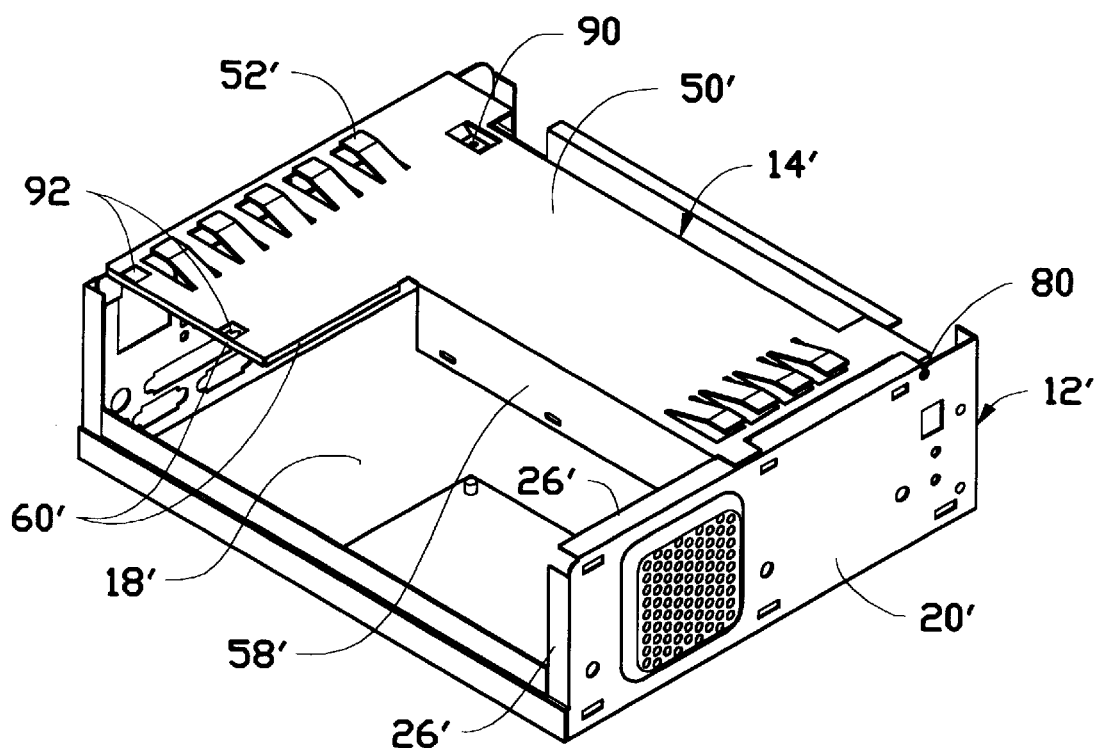
FIG. 5 is a perspective view of the second embodiment of the computer housing in accordance with the present invention showing a bracket mounted on a base frame.
Figure 6:
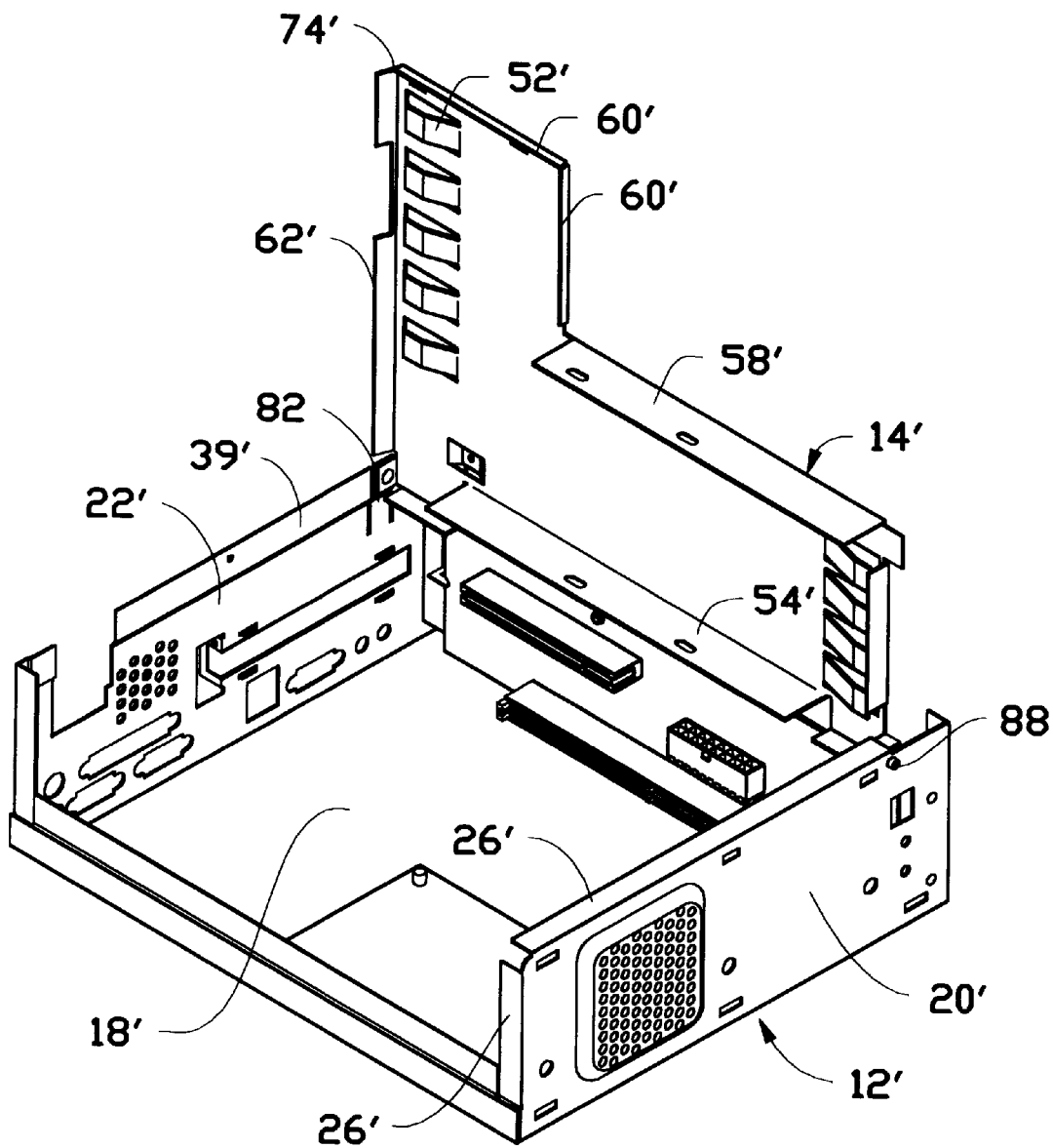
FIG. 6 is a perspective view of the computer housing of FIG. wherein the bracket has been pivoted outward and with respect to the base frame.

FIGS. 4–6 show a second embodiment of the computer housing 10' similar to the computer housing 10 of the first embodiment, and includes a base frame 12', a mounting bracket 14', and a top cover 16', wherein the top cover 16' is identical to the top cover 16. The differences between the base frame 12 and 12' are that the front panel 20' has no structure like the cutout 28, a pivot hole 80 is defined in the upper right portion of the front panel 20', and a resilience strip 82 defining a pivot hole 84 is formed on the rear panel 22'. The mounting bracket 14' has a mounting panel 50', a plurality of grounding spring fingers 52', arches 56', 60' smaller than the arches-56, 60, a tab 86 formed on the front portion, pivots 88 formed at the longitudinally opposing positions (only the front one is shown), a loop 90 and two square openings 92 defined in the rear portion of the locating plate 50' for mounting the power supply (not shown).

The power supply can hook on the openings 92 and be fastened to the mounting bracket 14' by cooperating with the loop 90 and a screw (not shown). As seen in FIG. 5, the pivots 88 are received in the pivot holes 80, 84, thereby pivotally mounting the mounting bracket 14' to the base frame 12'. The tab 86 rested on the bend 26' and the gap 74' is engaged with the edge 39' to support the mounting bracket 14' on the front and rear panels 20', 22'. FIG. 6 shows the mounting bracket 14' pivoted outward, therefore, the power supply and hard disk can be inspected, repaired, assembled or replaced very easily.

While the present invention has been described with reference to specific embodiments, the description is illustrative of the invention and is not to be construed as limiting the invention. Various modifications to the present invention can be made to the preferred embodiment by those skilled in the art without departing from the true spirit and scope of the invention as defined by the appended claims.

Therefore, persons of ordinary skill in this field are to understand that all such equivalent structures are to be included within the scope of the following claims.

We claim:

1. A computer housing, comprising:

a base frame having a base panel, a front panel perpendicular to said base panel, and a rear panel opposite said front panel and perpendicular to said base panel;

a mounting bracket having a mounting panel and a plurality of arches folded inwardly along edges of said mounting panel and supported on and between said front and rear panels, defining at least one space for receiving computer subsystem components and forming two pivots at longitudinally opposing positions;

a top cover having an interior and covering said mounting bracket and assembled with said base frame;

said mounting panel having at least one spring finger outwardly projecting from the mounting panel and contacting the interior of the top cover;

two pivot holes defined on said front and rear panels respectively for receiving said corresponding pivots thereby pivotally mounting said mounting bracket to said base frame, wherein said pivot hole of the rear panel is defined in a resilient strip.

2. A computer housing for containing computer subsystem components therein, comprising:

a base frame having a base panel, a front panel perpendicular to said base panel, and a rear panel opposite said front panel and perpendicular to said base panel, said front panel defining a pivot hole and said rear panel having a resilient strip wherein another pivot hole is defined therein;

a mounting bracket forming two pivots at longitudinally opposing positions wherein said pivots are received in said pivot holes of said front and rear panels for pivotally mounting said mounting bracket between said front and rear panels and defining at least one space for receiving said computer subsystem components;

a top cover covering said mounting bracket and assembled with said base frame.

3. A computer housing for containing computer subsystem components therein, comprising:

a base frame having a base panel, a front panel perpendicular to said base panel, and a rear panel opposite said front panel and perpendicular to said base panel, said front panel defining a pivot hole and said rear panel having a resilient strip wherein another pivot hole is defined therein;

a mounting bracket having a mounting panel partially covering said base frame and hanging said computer subsystem components and forms two pivots at longitudinally opposing positions wherein said pivots are received in said pivot holes of said front and rear panels for pivotally mounting said mounting bracket between said front and rear panels and defining at least one space for receiving said computer subsystem components;

a top cover covering said mounting bracket and assembled with said base frame.

* * * * *